United States Patent [19]

Hickley et al.

[11] Patent Number: 4,854,129
[45] Date of Patent: Aug. 8, 1989

[54] COOLING PROCESS AND APPARATUS

[76] Inventors: Pieter Hickley, 268 Bridle Park, Randburg, Transvaal Province; Cornelius J. Claassen, 14 Harrington Street, Schoemansville, Transvaal Province, both of South Africa

[21] Appl. No.: 202,671

[22] Filed: Jun. 6, 1988

[30] Foreign Application Priority Data

Jun. 11, 1987 [ZA] South Africa ............. 87/4207

[51] Int. Cl.⁴ .............................. F28D 5/00
[52] U.S. Cl. ............................ 62/304; 62/309; 261/117; 261/118; 261/DIG. 3
[58] Field of Search ............ 62/304, 309, 171; 261/117, 118, DIG. 3

[56] References Cited

U.S. PATENT DOCUMENTS 2,379,932 7/1945 Schoepelin et al. .
2,454,883 11/1948 Olstad et al. .
2,488,116 11/1949 Berlowitz .
3,116,612 1/1964 Pennington .
3,214,936 11/1965 Di Peri .
3,696,630 10/1972 Bressickello .
3,808,832 5/1974 Zusmanovich ............ 62/309
3,818,718 6/1974 Freese .
3,903,213 9/1975 Stover .
4,023,949 5/1977 Schlom et al. .
4,156,351 5/1979 Schlom et al. .
4,380,910 4/1983 Hood et al. .
4,660,390 4/1987 Worthington .

FOREIGN PATENT DOCUMENTS 1109559 8/1984 U.S.S.R. .................. 62/309

Primary Examiner—Henry A. Bennet
Assistant Examiner—John Sollecito
Attorney, Agent, or Firm—Dowell & Dowell

[57] ABSTRACT

A method of cooling air and a cooling apparatus is disclosed wherein primary air is passed through at least one primary chamber to provide secondary air at an outlet of the primary chamber. Secondary air is passed in a counterflow direction through at least one secondary chamber which is in heat exchange relationship with the primary chamber. An evaporative fluid is applied to the secondary air and optionally to a downstream portion of the primary air in the primary chamber. This causes cooling of the downstream portion of the primary air and of the secondary air and of the evaporative fluid and simultaneously causes cooling of the primary air in the primary chamber by reason of the heat exchange relationship between the primary and secondary chambers. A turbulent boundary layer can be created in the secondary air by introducing a portion of the primary air directly into the secondary chamber from the primary chamber.

11 Claims, 11 Drawing Sheets

COOLING PROCESS AND APPARATUS

BACKGROUND OF THE INVENTION

Field of the Invention

This invention relates to a method of cooling air and to a cooling apparatus.

SUMMARY OF THE INVENTION

In accordance with one aspect of the invention a method of cooling air includes:

passing primary air through at least one primary chamber to provide secondary air at an outlet of the primary chamber, passing the secondary air in a counterflow direction through at least one secondary chamber which is in heat exchange relationship with the primary chamber, applying an evaporative fluid to a downstream portion of the primary air in the primary chamber and to the secondary air in the secondary chamber to cause cooling of the downstream portion of the primary air and of the secondary air and of the evaporative fluid and thereby simultaneously to cause cooling of the primary air in the primary chamber by reason of the heat exchange relationship between the primary and secondary chambers.

In accordance with a further aspect of the invention, a method of cooling air includes:

passing primary air through at least one primary chamber to provide secondary air at an outlet of the primary chamber, passing the secondary air in a counterflow direction through at least one secondary chamber which is in heat exchange relationship with the primary chamber, applying an evaporative fluid to the secondary air in the secondary chamber to cause cooling of the secondary air and of the evaporative fluid and thereby simultaneously to cause cooling of the primary air in the primary chamber by reason of the heat exchange relationship between the primary and secondary chambers, and creating a turbulent boundary layer in the secondary air by introducing a portion of the primary air directly into the secondary chamber from the primary chamber.

Further according to the invention there is provided a cooling apparatus which includes:

at least one primary chamber having an inlet for receiving primary air and an outlet for delivering secondary air, at least one secondary chamber in heat exchange relationship with the primary chamber via a common wall, the secondary chamber having an inlet at a downstream end of the primary chamber for receiving secondary air delivered from the primary chamber and being arranged to convey the secondary air in a counterflow direction to the primary air, discharge means operable to discharge an evaporative fluid into a downstream portion of the primary chamber and into the secondary chamber thereby to cause cooling of the downstream portion of the primary air and the secondary air and of the evaporative fluid by means of evaporative cooling and simultaneously to cause cooling of the primary air by reason of the heat exchange relationship between the primary and secondary chambers.

Still further according to the invention, there is provided a cooling apparatus which includes:

at least one primary chamber having an inlet for receiving primary air and an outlet for delivering secondary air, at least one secondary chamber in heat exchange relationship with the primary chamber via a common wall, the secondary chamber having an inlet at a downstream end of the primary chamber for receiving secondary air delivered from the primary chamber and being arranged to convey the secondary air in a counterflow direction to the primary air, discharge means operable to discharge an evaporative fluid into the secondary chamber thereby to cause cooling of the secondary air and of the evaporative fluid by means of evaporative cooling and simultaneously to cause cooling of the primary air by reason of the heat exchange relationship between the primary and secondary chambers, the common wall forming a heat exchange interface between the primary and secondary chambers having a plurality of apertures therein arranged to introduce a portion of the primary air directly into the secondary air from the primary chamber thereby to cause a turbulent boundary layer in the secondary air.

The discharge means may include a plurality of nozzles. In another embodiment, the discharge means may include a distribution head for distributing the evaporative fluid.

If desired, the method may include collecting the evaporative fluid and passing the collected fluid through a coil arranged in the path of the primary air thereby further to cool the primary air. The apparatus may then include a sump for collecting the evaporative fluid and a pump for pumping the evaporative fluid collected in the sump through a coil arranged in the path of the primary air. The coil may be located near the outlet of the primary chamber.

The method may further include controlling the relationship between the secondary air introduced into the secondary chamber and working air released from the primary chamber for cooling purposes. A baffle may then be arranged in the path of the primary air and operable to control the relationship between the degree of primary air passed to the secondary chamber as secondary air and that exhausted as working air for cooling purposes.

The portion of the primary air introduced into the secondary air through the apertures is conveniently of a quantity to cause sufficient momentum exchange in the interface between the boundary layers of the primary and secondary air to cause the turbulence and further assists in increasing the evaporative cooling process due to the inherent moisture content contained in the primary air portion bled off into the secondary chamber through the apertures as it crosses the heat exchange interface formed by the common wall.

Air may be introduced into the primary chamber by means of a blower.

The primary and secondary air chambers may be defined by walls of a variety of configurations, eg. round, oval, rectangular, triangular, or the like. The common wall forming the heat exchange interface between the primary and secondary chamber may also if desired be corrugated to increase the effective surface area of the interface. The length of the chambers and the surface area of the heat exchange interface may be selectably varied dependent upon the use to which the apparatus is to be put and upon the climatic conditions of the area in which the apparatus is to be located.

A plurality of primary and secondary chambers may be arranged alternately extending in parallel relationship or at an angle relative to each other. The secondary chambers may be filled with a material to extend the fluid evaporative surface.

BRIEF DESCRIPTION OF THE DRAWINGS

Various embodiments of the invention are now described by way of example with reference to the accompanying drawings, in which.

DESCRIPTION OF THE PREFERRED EMBODIMENT

Figure 1:
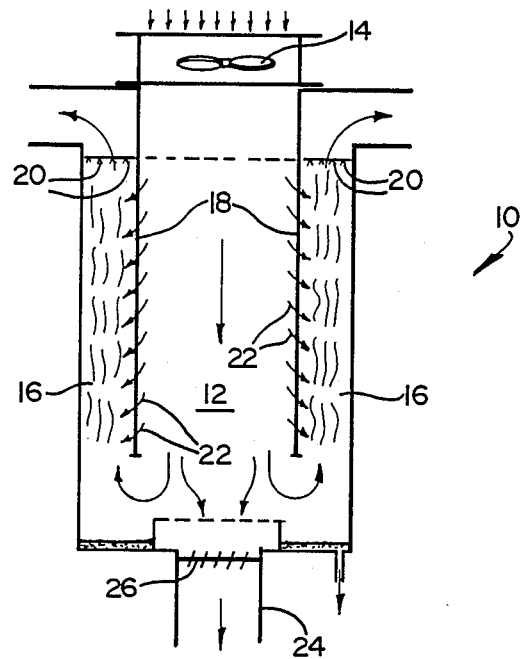
FIGS. 1, 2 and 3 show schematic cross sectional views of various embodiments of a cooling apparatus in accordance with the invention.

Referring to the drawings, reference numeral 10 generally indicates a cooling apparatus which includes a primary chamber 12 having an inlet for receiving air from a blower 14. Air in the primary chamber 12 is referred to as primary air or available air. The primary chamber 12 delivers air into a secondary chamber 16 which in all three of the FIGS. 1 to 3 embodiments is arranged co-axially with the primary chamber 12. Air in the secondary chamber 16 is referred to as secondary air.

The wall 18 defining the primary chamber 12 forms a common wall between the primary chamber 12 and the secondary chamber 16 and forms a heat exchange interface between the primary chamber 12 and the secondary chamber 16. Discharge means in the form of a plurality of spray nozzles 20 are provided in the secondary chamber 16 and are arranged to spray an evaporative fluid, eg. water, into the secondary air contained in the secondary chamber 16. In the FIGS. 1 and 2 embodiments, the nozzles 20 are arranged to spray the evaporative fluid in a counterflow direction to the direction of the secondary air while, in the FIG. 3 embodiment, the nozzles 20 spray the evaporative fluid in the same direction as the secondary air flow.

In all embodiments illustrated, the wall 18 has a plurality of small apertures therein to permit a portion of primary air as indicated by arrows 22 to be introduced directly into the secondary chamber 16 from the primary chamber 12. As the portion of primary air passing through the apertures enters the secondary chamber 16 transversely to the secondary air, turbulence is caused thereby enhancing the evaporative cooling and heat exchange process in the secondary chamber 16 due to the inherent moisture content contained in the primary air bled into the secondary chamber 16.

Figure 3:
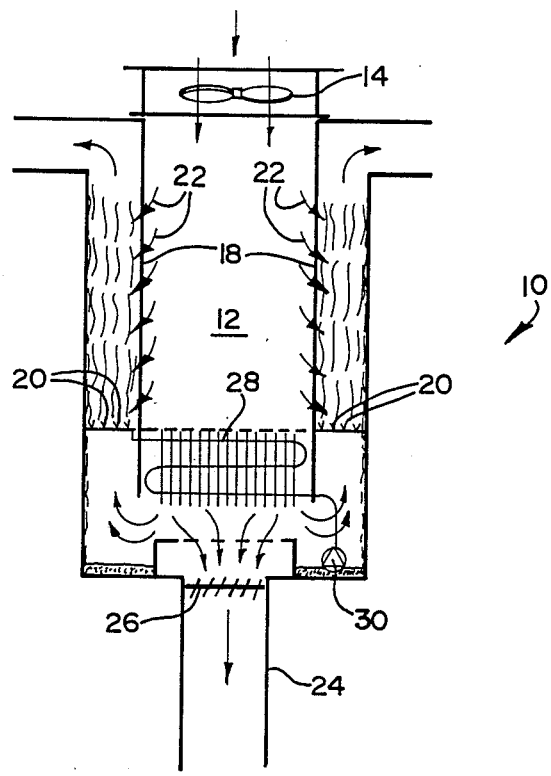

In the FIGS. 1 and 3 embodiments, portion of the primary air from the primary chamber 12 is exhausted as working air via an outlet duct 24 to provide cooled air eg. in a dwelling or building. In order to control the ratio of working air to air used as secondary air in the secondary chamber 16, a baffle 26 is provided. The baffle 26 is adjustable to vary this ratio.

Figure 2:
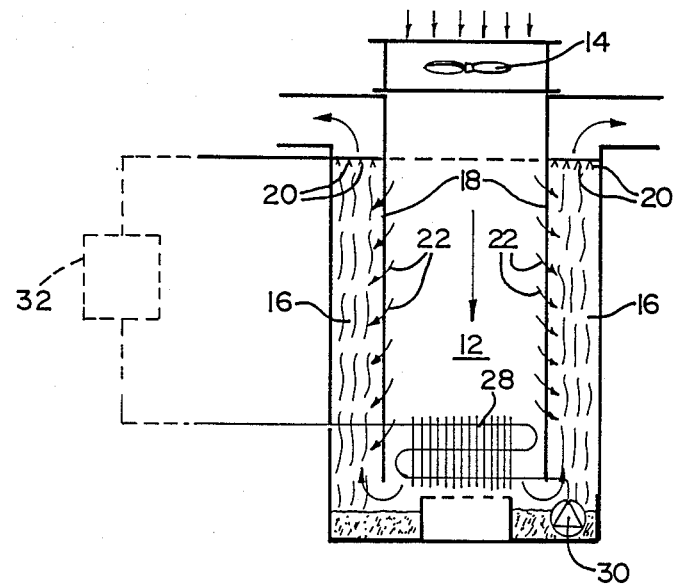

In the FIG. 2 embodiment, all the primary air is used as secondary air in the secondary chamber 16 and thus the FIG. 2 embodiment works in effect as a cooling tower.

In the FIGS. 2 and 3 embodiment, a coil 28 is provided near the outlet end of the primary chamber 12. A pump 30 collects the evaporative fluid which has been cooled in the evaporative cooling process and passes it through the coil 28 thereby to increase the cooling process. All or only portion of the primary air may be passed through the coil 28 as required.

In the FIG. 2 embodiment, in addition, fluid exhausted from the coil 28 is optionally fed via an external apparatus 32 incorporating a heat rejection process and the fluid is then returned to the spray nozzles 20. Instead of returning the fluid to the spray nozzles 20, the cooled fluid may be used for other purposes.

In use, the secondary air in the secondary chamber 16 is cooled by the evaporative cooling process caused by the spraying of the evaporative fluid from the nozzles 20. This causes cooling of the secondary air in the secondary chamber 16 and also cooling of the evaporative fluid. The common wall 18 provides a heat exchange interface whereby this cooling process is applied to the primary air in the primary chamber 12 thereby cooling the primary air. In the FIGS. 1 and 3 embodiments, it will be noted that the moisture content of the working air exhausted from the duct 24 is not increased during the cooling process. During the heat exchange process between the secondary air in the secondary chamber 16 and the primary air in the primary chamber 12, the secondary air is heated and then recooled by further evaporative cooling, again reheated by the heat exchange process and again cooled by the evaporative cooling process. A continuous cooling process therefore occurs along the heat exchange interface formed by the common wall 18. Initially, when the blower 14 is turned on, the primary air nearer to the outlet of the primary chamber 12 is cooled to a greater degree then the air more remote from the outlet of the primary chamber until a state of equilibrium is reached. The cooling effect is thus increased as the air approaches the outlet of the primary chamber 12. During the heat exchange interaction process, when the secondary air stream is heated, it is capable of accepting moisture and this results in further cooling of the secondary air stream and of the evaporative fluid. In this manner, the secondary air stream and the evaporative fluid are continuously recooled to provide an increased driving force for cooling the primary air.

In the FIGS. 2 and 3 embodiments, additional cooling is provided by the coil 28 although the coil is not always essential in the apparatus.

The secondary air exhausted from the secondary chamber 16 can be used to cool non-critical high humidity areas or can be simply discharged to the atmosphere.

The cooling process is graphically illustrated in the psychrometric charts of FIGS. 4 to 7. In the charts, the dry bulb temperature in degrees Centigrade is shown on the base line 34 of the charts while the humidity ratio, ie. the kilogram moisture per kilogram of dry air, is shown on the vertical axis 36. The wet bulb temperature in degrees Centigrade is indicated by the sloping lines 40 and the relative humidity is indicated by lines 42. The FIG. 4 chart illustrates the cooling process of the FIG. 1 embodiment, the FIGS. 5 and 6 charts illustrate the cooling process of the FIG. 2 embodiment and the FIG. 7 chart illustrates the cooling process of the FIG. 3 embodiment.

Initially, available air entering the primary chamber 12 is at position 1 and gradually moves towards position 8 caused by the heat exchange interaction process between the primary chamber 12 and the secondary chamber 16. Cooling by the coil 28 will reduce the air stream to condition 9. The division of the primary air and secondary air causes the secondary air after its first encounter with the evaporative cooling process to be conditioned to 9.1 in FIG. 7. The driving force between position 9.1 and 7 which exists in the downstream portion of the heat exchanger (as viewed from the inlet end of the primary air chamber) will cause an increase from condition 9.1 to 9.2 in the secondary air stream and a decrease from 7 to 8 in the available air stream. The condition of the secondary air which is now at 9.2 then allows for recooling by the evaporative cooling process due to the temperature increase from 9.1 to 9.2. Consequently, a condition 8.1 is reached whereby a driving force between 8.1 and 6 exists. A cascade type repeat of the above process is thus allowed.

During the evaporative cooling processes from 9.1–9.2 to 8.1–8.2 to 7.1 . . . 4.2–3.1, the evaporative fluid will also reach a temperature very close to 9.1, 8.1, 7.1 . . . 3.1 respectively, in each section of the heat exchanger where the evaporative cooling takes place. This assists in cooling the heat exchange interface and forms part of the driving force which cools the primary air stream.

This process will continue upwardly in the heat exchanger towards the inlet of the primary chamber 12 where the driving force for cooling exists between positions 3.1 and 1.

Although the charts represent an incremental scale of cooling, the process is in effect a continuous process of heating, cooling by spraying and cooling by sensible heat exchange which will result in no moisture addition to the primary air stream. The actual path of the secondary air as plotted on the psychrometric charts would be nearer to the 100% saturation efficiency curve connecting points 9.1 to 8.1 to 7.1 to . . . 3.1 directly.

Figure 4:
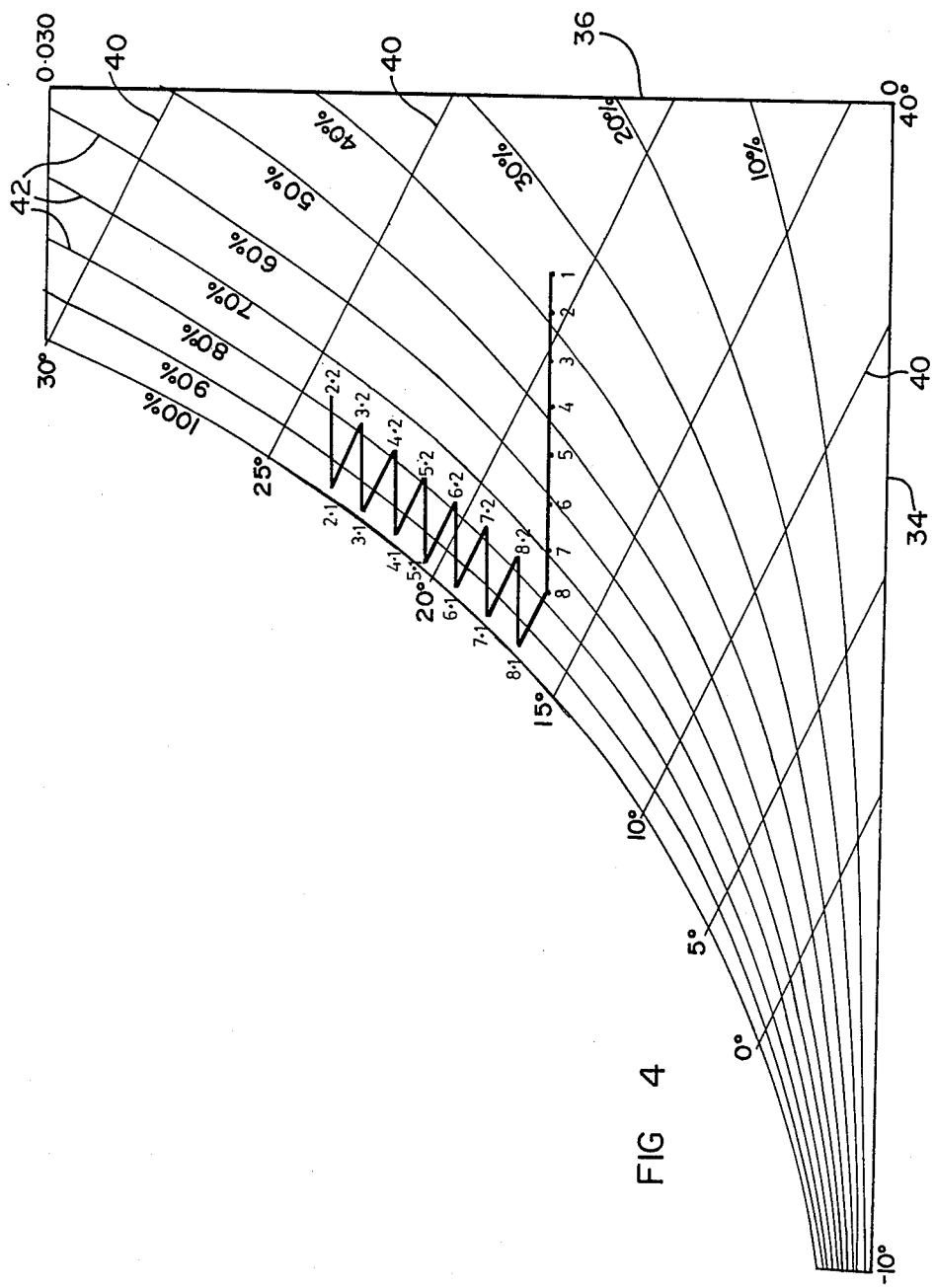
FIGS. 4, 5, 6 and 7 show psychometric charts illustrating the effect of the cooling apparatus of FIGS. 1 to 3.

In FIG. 4, that portion of the available air which has been separated from the primary air for secondary cooling purposes is shown to reach condition 8 as a result of the continuous heat exchange process between the available air in the chamber 12 and the secondary air and the evaporative fluid. After the first encounter with the evaporative fluid in the lower portion of the secondary chamber 16, this air is cooled to condition 8.1. The driving force between 8.1 (of the secondary air stream) and 7 (of the available air stream) provides cooling of the available air stream from condition 7 to condition 8 while heating the secondary air steam from 8.1 to 8.2. The evaporative fluid, now also at a temperature approximately 8.1, assists in this cooling process. The secondary air which is now at 8.2 can absorb evaporative fluid and by evaporative cooling would be cooled to 7.1 with the evaporative fluid also at 7.1 after evaporation has occurred. The driving force between the secondary air and evaporative fluid at 7.1 and available air at 6 in the corresponding portion of the primary chamber will then again, in the same manner, cause the secondary air to be heated to 7.2 while the available air stream is simultaneously cooled form condition 6 to condition 7. In the same manner, the process continues along the heat exchanger towards the inlet end of the primary chamber when the driving force between condition 2.1 and condition 1 results in heating of the secondary air from condition 2.1 to condition 2.2 while cooling the available air from condition 1 to condition 2.

Figure 5:
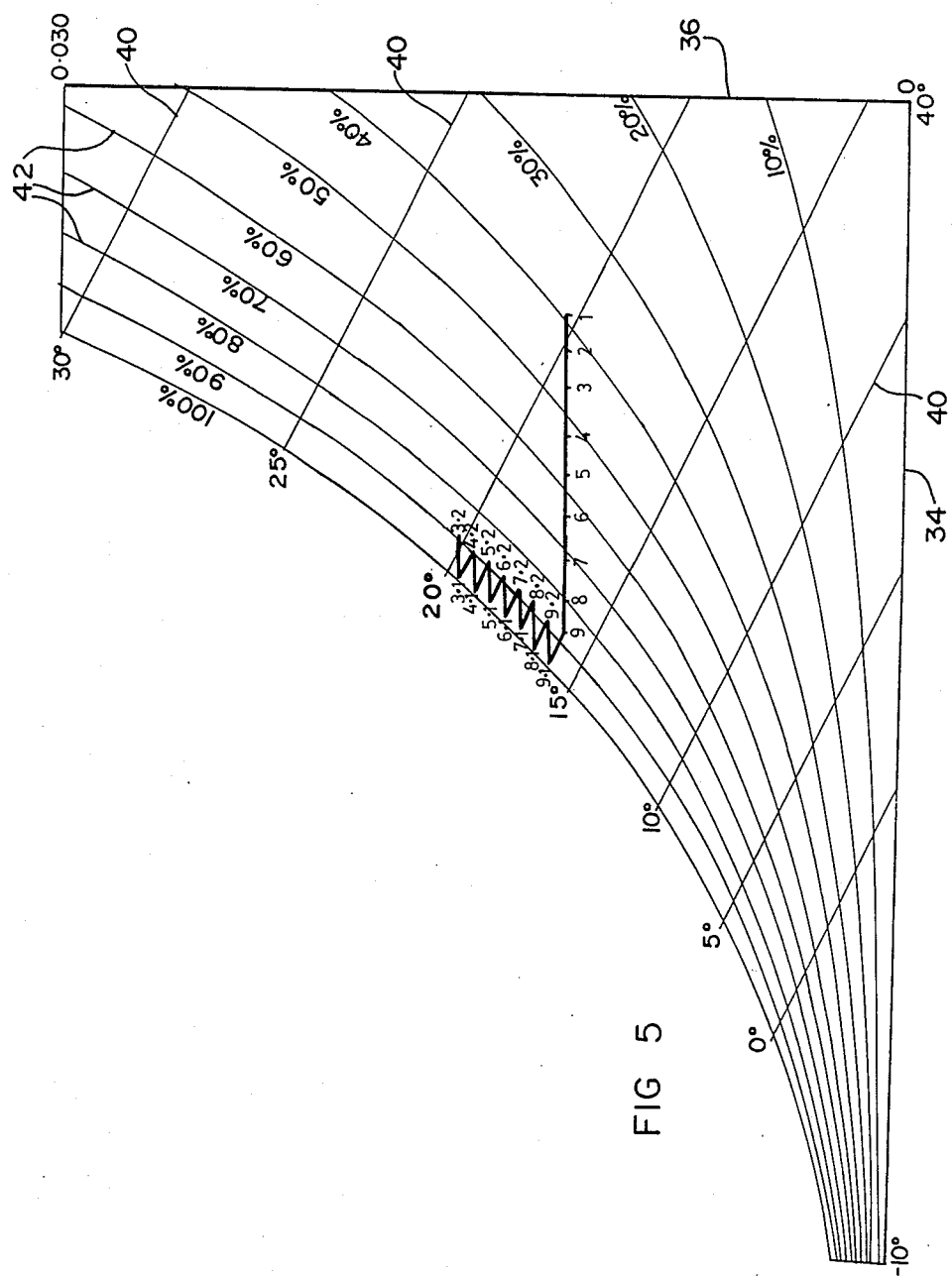
Figure 6:
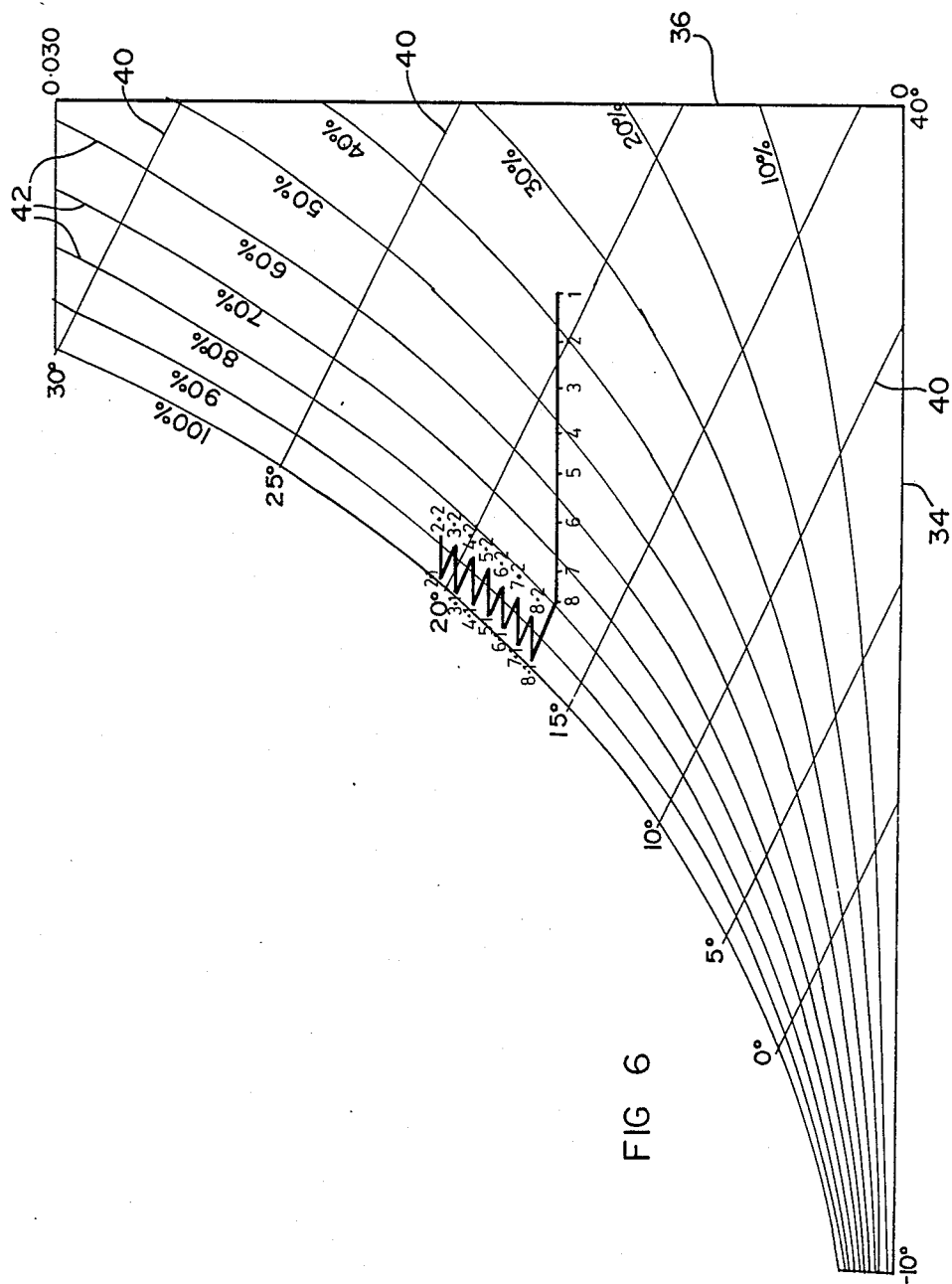
Figure 7:
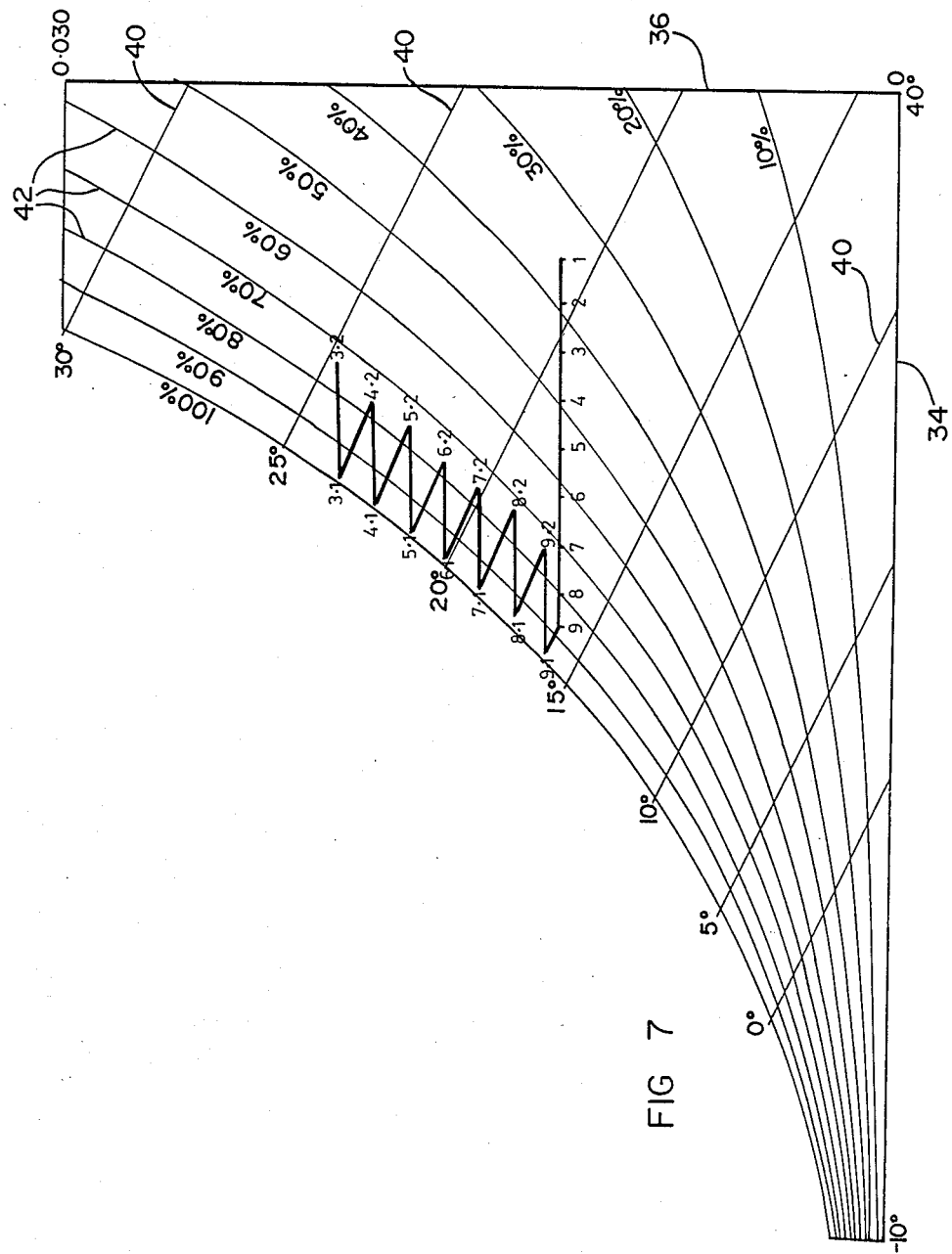

The psychrometric charts of FIGS. 5 and 6 illustrate the cooling process of the FIG. 2 embodiment when the coil 28 is incorporated in the system and when the coil 28 is omitted, respectively.

In FIG. 2, it will be recollected, the apparatus is utilized firstly to cool the evaporative fluid for further use in an external heat rejection system and secondly, for cooling the available air stream for further use if required.

In FIG. 2, available air entering the primary chamber 12 via blower 14 is passed through the primary chamber 12 which is in constant heat exchange relationship with the secondary chamber 16. The evaporative fluid supplied to nozzles 20 may be heated fluid recirculated through an external heat rejection apparatus 32 or may be a make up system if the evaporative fluid is used for other purposes. The evaporative fluid is cooled in the secondary chamber 16 by the evaporation process and the secondary air, unlike the other embodiments, is quantitatively equal to the available air steam. The secondary air stream absorbs the evaporative fluid and is cooled and by reason of the heat exchange relationship cools the available air stream in the primary chamber 12. The available air stream is cooled continuously along the heat exchange interface while the secondary air is simultaneously heated. The heating process of the secondary air allows the secondary air to absorb the evaporative fluid to produce further cooling.

In the psychrometric chart shown in FIG. 5, ie. with the cooling coil 28 included in the system, the available air is cooled to condition 8 in the primary chamber 12 nd condition 9 by the cooling coil 28. The available air now forms the secondary air. After the first encounter with the evaporative fluid, the secondary air and evaporative fluid are both cooled to condition 9.1 in the lower section of the secondary chamber 16. The temperature difference between the secondary air at 9.1 and available air at 7, allows the available air to be cooled from condition 7 to condition 8, while the secondary air is simultaneously heated form condition 9.1 to 9.2 in the corresponding opposite section of the heat exchanger. This allows the secondary air stream to accept further evaporative fluid and it is thus cooled from condition 9.2 to 8.1. Similarly, the evaporative fluid is cooled to approximately 8.1. A similar drive in a further section of the heat exchanger now exists between 8.1 (secondary air) and 6 (available air) which allows a repeat of the heat exchange process described above until the difference between condition 3.1 and 1 is the final drive at the inlet to the heat exchanger. The evaporative fluid flowing against the secondary air stream is cooled continuously in the secondary chamber. As it enters, it is at or above condition 3.1 and gradually proceeds to condition 9.1 when it is collected in the sump beneath the secondary chamber 16 and is available for external heat rejection.

When the cooling coil 28 is eliminated as shown in the FIG. 6 chart, the available air and evaporative fluid are only cooled to condition 8 and the absence of the cooling coil prevents condition 9 being achieved.

Figure 8:
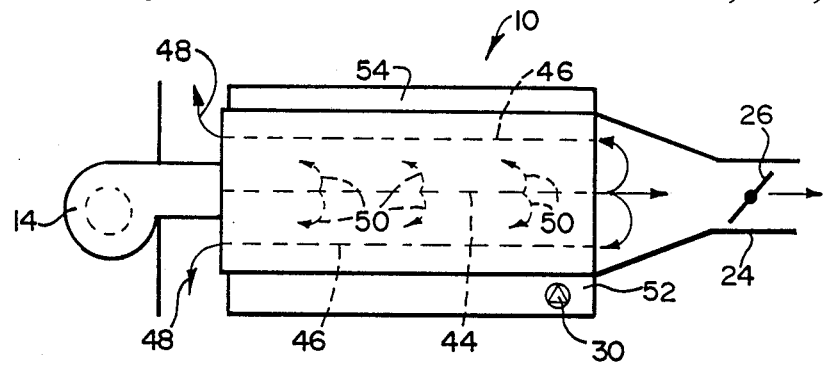
FIGS. 8, 9, 10 and 11 show schematic side elevations of various configurations of cooling apparatus.

FIGS. 8, 9, 10 and 11 illustrate various configurations of a cooling apparatus in accordance with the invention. In FIG. 8, the apparatus is arranged in a horizontal configuration. The blower 14 passes primary air 44 through the primary chamber (not shown) and the secondary air 46 flows in a counterflow direction and is exhausted transversely at 48. Again, a portion of the primary air is introduced directly from the primary chamber into the secondary air stream as indicated by arrows 50. A baffle 26 controls the ratio of working air exhausted via outlet duct 24 and the degree of secondary air 46. A pump 30 is used to pump water as evaporative fluid from a sump 52 to discharge means 54 extending long the full length of the apparatus. The discharge means 54 is arranged to discharge the water into a wet pack (not shown) contained in the secondary chamber and along the inner walls of the secondary chamber.

Figure 9:
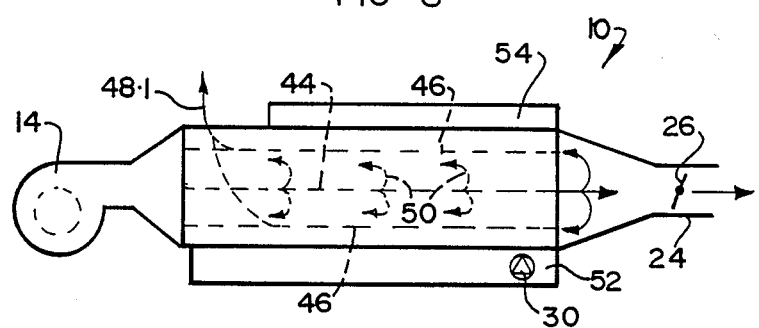

In the FIG. 9 embodiment, a similar arrangement is shown except that the secondary air 46 is exhausted at 48.1 and the discharge means 54 extends only along portion of the apparatus. The secondary air could additionally or alternatively be exhausted at a position opposite to position 48.1.

Figure 10:
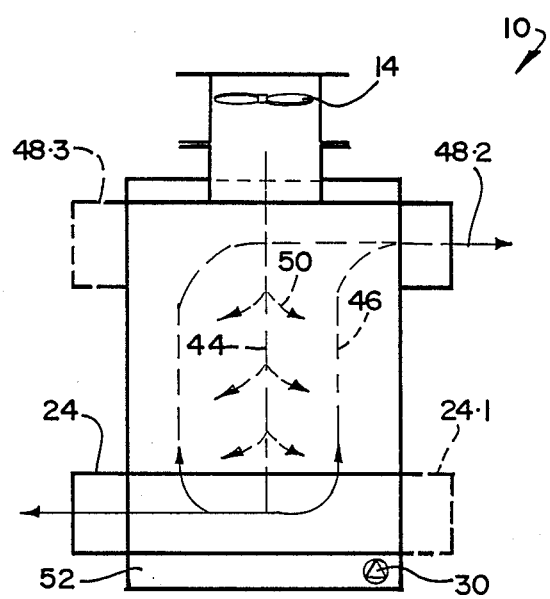

In the FIG. 10 embodiment, the apparatus is arranged vertically and the secondary air is exhausted at 48.2. If desired, the secondary air can additionally or alternatively be exhausted at 48.3 or at any other convenient position. The working air is delivered from a horizontal outlet duct 24 which may, if desired also be arranged at position 24.1 or in a vertical direction.

Figure 11:
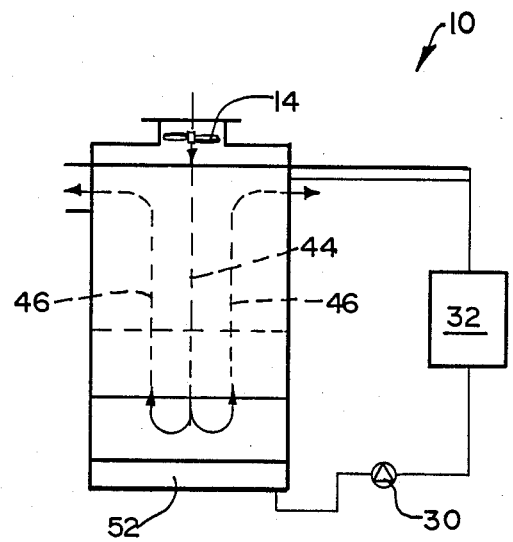

FIG. 11 shows an embodiment similar to FIG. 2 where all the primary air 44 is returned as secondary air 46. The pump 30 instead of being mounted internally in the sump 52 is now mounted externally and delivers water as an evaporative fluid via an external heating load or heat rejection apparatus 32 which heats the evaporative fluid to a temperature below the wet bulb temperature of the air entering via the blower 14.

Figure 12:
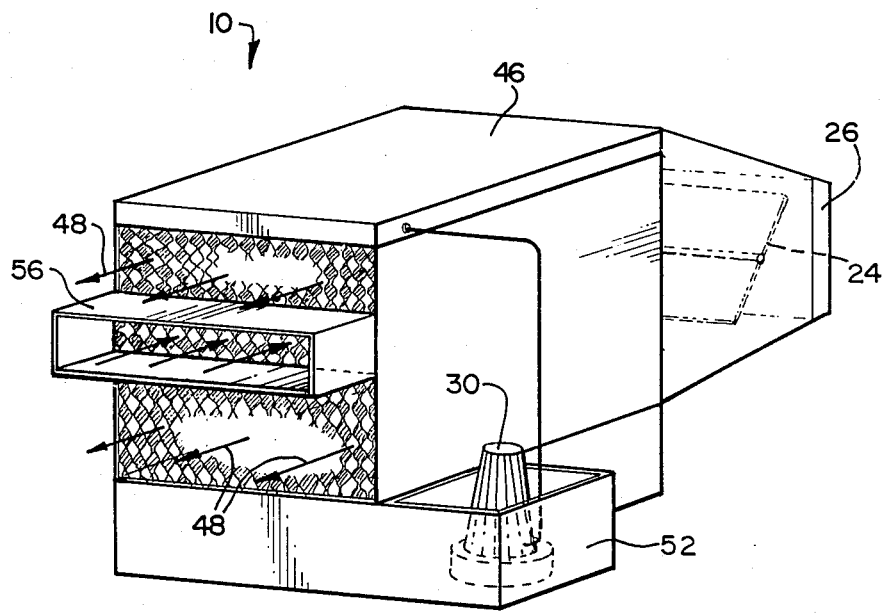
FIG. 12 shows a three dimensional view of a cooling apparatus.

FIG. 12 illustrates a three dimensional view of the FIG. 8 embodiment with the blower 14 removed for illustration purposes. The primary air is introduced via a housing 56 over only portion of the height of a heat exchange interface formed by corrugated plates, details of which will be described with reference to FIGS. 16 and 17. The secondary air is exhausted as indicated at 48.

Figure 13:
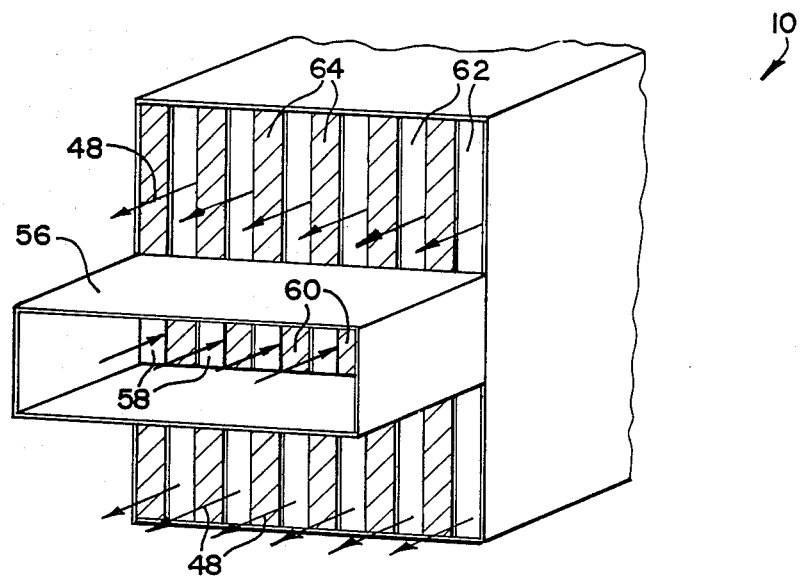
FIG. 13 shows a schematic three dimensional representation of the FIG. 12 apparatus.

FIG. 13 is a schematic illustration of how the primary and secondary chambers are arranged alternately in parallel relationship. Within the housing 56, the unshaded zones 58 represent the inlets to the primary chambers while the shaded zones 60 represent the closed off ends of the secondary chambers. On either side of the housing 56 the unshaded zones 62 represent the outlet ends of the secondary chambers while the shaded zones 64 are closed off ends of the primary chambers.

Figure 14:
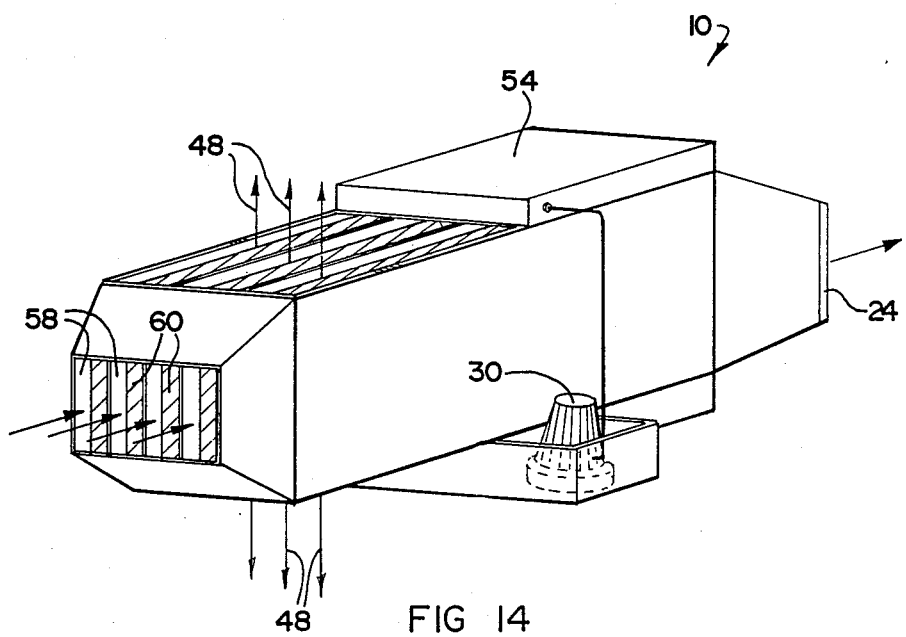
FIG. 14 shows a three dimensional view of a further cooling apparatus.

In FIG. 14, a three dimensional view of the FIG. 9 embodiment is shown again with the blower 14 removed. Air enters the primary chambers via zones 58 and secondary air is exhausted transversely in opposite directions at 48.

Figure 15:
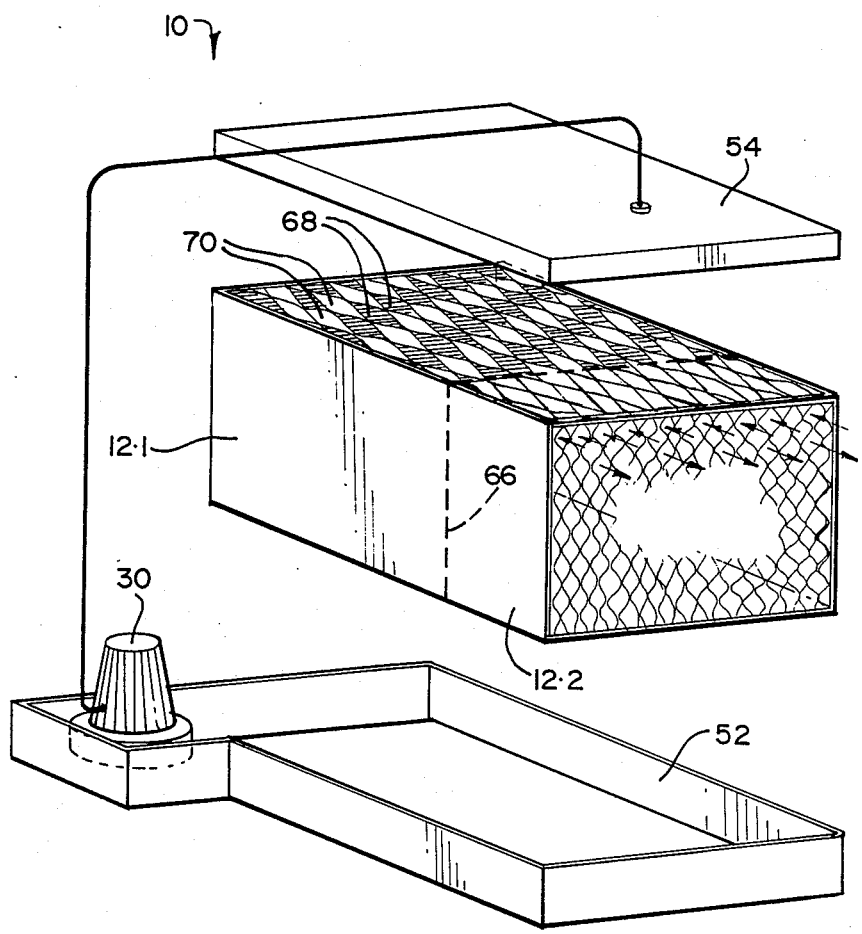
FIG. 15 shows a three dimensional view of still a further form of cooling apparatus.

FIG. 15 is a schematic illustration of a modification of the cooling apparatus wherein, in effect, the primary chambers are divided into two sections 12.1 and 12.2. The dividing line between the sections 12.1 and 12.2 is indicated by a dotted line 66. It will be noted that over the section 12.1, the primary chambers indicated by the shaded zones 68 are closed off to prevent the evaporative fluid from the discharge means 54 entering the primary chambers. The secondary chambers indicated by the unshaded zones 70, are open to receive the evaporative fluid. However, in the section 12.2, both the primary and secondary chambers are capable of receiving evaporative fluid from the discharge means 54. Thus, in a downstream portion of the primary chambers, an evaporative fluid is applied to both the primary air and the secondary air.

Figure 16:
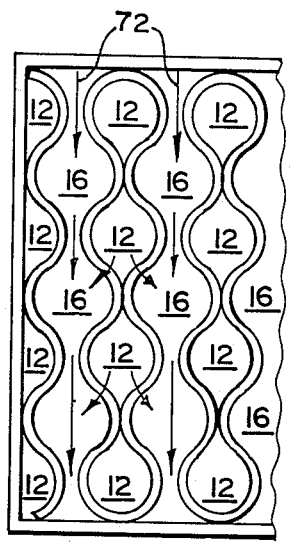
FIG. 16 shows a schematic end view to a larger scale of portion of the apparatus of FIG. 15.

One specific arrangement of the primary and secondary chambers in section 12.1 of FIG. 15 is shown in FIG. 16. In FIG. 16, it will be noted that the primary chambers 12 are completely enclosed while the secondary chambers are open to receive the evaporative fluid indicated by arrows 72. Again, portion of the primary air is bled into the secondary chambers 16 directly from the primary chambers 12 to cause turbulence thereby to improve the heat transfer characteristics of the secondary air as the primary air is drier than the air in the secondary chambers 16. This assists in the evaporation of the evaporative fluid in the secondary chambers 16.

The open lower portions of the secondary chambers 16 can be sealed by a suitable seal around the periphery of the sump 52 (not shown in FIG. 16). In another embodiment, the lower portion of the heat exchange interface of section 12.1 can be lowered into the evaporative cooling fluid contained in the sump to a depth equal to or greater than the static pressure developed by the blower 14 to prevent air flow escaping from the sump.

Figure 17:
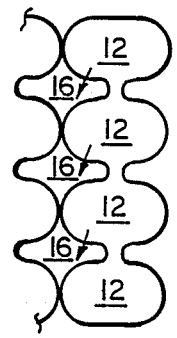
FIG. 17 illustrates a modification of the FIG. 16 apparatus.
Figure 18:
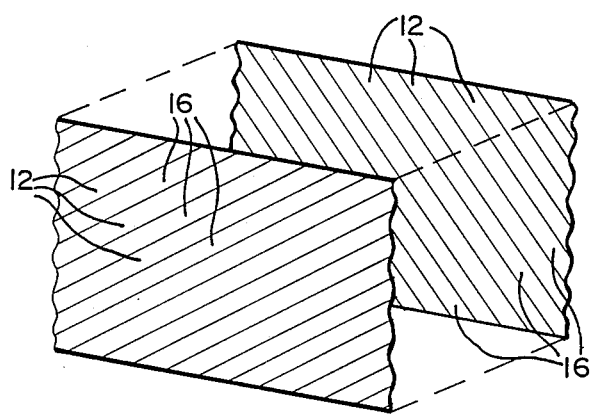
FIG. 18 shows a schematic representation of a modified configuration of the apparatus.

In FIG. 17, in order to optimize and control the pressure in the primary and secondary air streams, the secondary chambers are made of a smaller size than the primary chambers 12. The size of the primary and secondary chambers can be selected dependent upon the pressure required in the working air exhausted from the apparatus and the pressure required to cause sufficient turbulence. Also, as schematically shown in FIG. 18, instead of the peaks and valleys of the corrugations forming the primary and secondary chambers extending in parallel, they may be arranged at an angle to one another.

The primary and secondary chambers may be formed from a non-permeable material, eg. alumina, a synthetic plastics material, or the like. A wetting layer can be attached to the secondary chambers over section 12.1 of FIG. 15 and to both the primary and secondary chambers over section 12.2. Alternatively, if the reheating effect over section 12.2 on the primary air is negligible, the wetting layer can be applied to the primary chambers only in section 12.2. Instead of a non-permeable material, a permeable material such as impregnated paper can be used to which a sealing layer has been applied to the primary chambers.

The invention illustrated provides a cooling process and apparatus wherein the secondary air is cooled continuously by the evaporative cooling process which provides both cooled air and cooled evaporative fluid. The combination of the cooled fluid and cooled air is in turn used as a driving force for cooling the primary air. The psychrometric interaction of the primary and secondary air streams and the evaporative fluid is of a dynamic continuous nature permitting lower temperatures to be obtained by reason of the improved thermodynamic character of the continuous flow process combined with the use of a counterflow of secondary air. The use of a single air stream in the apparatus also causes a low temperature to be achieved in the secondary air entering the secondary chamber and when the heat exchange process is initiated this causes a lowering in the temperature of the air leaving the primary chamber.

What we claim is:

1. A method of cooling air which includes:
    passing primary air through at least one primary chamber to provide secondary air at an outlet of the primary chamber,
    passing the secondary air in a counterflow direction through at least one secondary chamber which is in direct heat exchange relationship with the primary chamber via a common wall,
    applying an evaporative fluid to all of a downstream portion of the primary air in the primary chamber and to the secondary air in the secondary chamber to cause cooling of the downstream portion of the primary air and of the secondary air and of the evaporative fluid and thereby simultaneously to cause cooling of the primary air in the primary chamber by reason of the heat exchange relationship between the primary and secondary chambers.

2. A method of cooling air which includes:
    passing primary air through at least one primary chamber to provide secondary air at an outlet of the primary chamber,
    passing the secondary air in a counterflow direction through at least one secondary chamber which is in heat exchange relationship with the primary chamber,
    applying an evaporative fluid to the secondary air in the secondary chamber to cause cooling of the secondary air and of the evaporative fluid and thereby simultaneously to cause cooling of the primary air in the primary chamber by reason of the heat exchange relationship between the primary and secondary chambers,
    and creating a turbulent boundary layer in the secondary air by introducing a portion of the primary air directly into the secondary chamber from the primary chamber.

3. A method as claimed in claim 2, which includes collecting the evaporative fluid and passing the collected fluid through a coil arranged in the path of the primary air.

4. A method as claimed in claim 2, which includes controlling the relationship between the secondary air introduced into the secondary chamber and working air released from the primary chamber for cooling purposes.

5. A cooling apparatus which includes:
    at least one primary chamber having an inlet for receiving primary air and an outlet for delivering secondary air,
    at least one secondary chamber in heat exchange relationship with the primary chamber via a common wall, the secondary chamber having an inlet at a downstream end of the primary chamber for receiving secondary air delivered from the primary chamber and being arranged to convey the secondary air in a counterflow direction to the primary air,
    discharge means operable to discharge an evaporative fluid into all of a downstream portion of the primary chamber and into the secondary chamber thereby to cause cooling of all of the downstream portion of the primary air and the secondary air and of the evaporative fluid by means of evaporative cooling and simultaneously to cause cooling of the primary air by reason of the heat exchange relationship between the primary and secondary chambers.

6. A cooling apparatus which includes:
    at least one primary chamber having an inlet for receiving primary air and an outlet for delivering secondary air,
    at least one secondary chamber in heat exchange relationship with the primary chamber via a common wall, the secondary chamber having an inlet at a downstream end of the primary chamber for receiving secondary air delivered from the primary chamber and being arranged to convey the secondary air in a counterflow direction to the primary air,
    discharge means operable to discharge an evaporative fluid into the secondary chamber thereby to cause cooling of the secondary air and of the evaporative fluid by means of evaporative cooling and simultaneously to cause cooling of the primary air by reason of the heat exchange relationship between the primary and secondary chambers, the common wall forming a heat exchange interface between the primary and secondary chambers having a plurality of apertures therein arranged to introduce a portion of the primary air directly into the secondary air from the primary chamber thereby to cause a turbulent boundary layer in the secondary air.

7. An apparatus as claimed in claim 6, in which the discharge means includes a plurality of nozzles arranged to eject the evaporative fluid into the air.

8. An apparatus as claimed in claim 6, which further includes a sump for collecting the evaporative fluid and a pump for pumping the evaporative fluid collected in the sump through a coil arranged in the path of the primary air.

9. An apparatus as claimed in claim 6, which includes a baffle arranged in the path of the primary air and operable to control the relationship between the degree of primary air passed to the secondary chamber as secondary air and that exhausted as working air for cooling purposes.

10. An apparatus as claimed in claim 6, in which the common wall forming a heat exchange interface between the primary and secondary chambers is corrugated.

11. An apparatus as claimed in claim 6, which includes a plurality of primary and secondary chambers arranged alternately in parallel relationship.

* * * * *